(12) United States Patent
Burja et al.

(10) Patent No.: US 12,065,029 B2
(45) Date of Patent: Aug. 20, 2024

(54) UNDERBODY MODULE AND MOTOR VEHICLE

(71) Applicant: Bayerische Motoren Werke Aktiengesellschaft, Munich (DE)

(72) Inventors: Andreas Burja, Eching (DE); Robert Loch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 317 days.

(21) Appl. No.: 17/595,508

(22) PCT Filed: Jul. 14, 2020

(86) PCT No.: PCT/EP2020/069828
§ 371 (c)(1),
(2) Date: Nov. 18, 2021

(87) PCT Pub. No.: WO2021/028141
PCT Pub. Date: Feb. 18, 2021

(65) Prior Publication Data
US 2022/0144068 A1 May 12, 2022

(30) Foreign Application Priority Data

Aug. 12, 2019 (DE) ...................... 10 2019 121 682.6

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/66* (2019.02); *B60L 58/26* (2019.02); *B62D 25/2036* (2013.01); *B60K 2001/0438* (2013.01)

(58) Field of Classification Search
CPC ... B60K 1/04; B60K 2001/0438; B60L 50/66; B60L 58/26
(Continued)

(56) References Cited

U.S. PATENT DOCUMENTS 10,723,234 B2 * 7/2020 Günther .................. B60L 50/66
10,826,032 B2 * 11/2020 Kaneshige .......... H01M 50/244
(Continued)

FOREIGN PATENT DOCUMENTS

CN 103303375 A 9/2013
DE 10 2010 022 876 A1 1/2011
(Continued)

OTHER PUBLICATIONS

International Search Report (PCT/ISA/210) issued in PCT Application No. PCT/EP2020/069828 dated Oct. 9, 2020 with English translation (four (4) pages).
(Continued)

*Primary Examiner* — Hau V Phan
(74) *Attorney, Agent, or Firm* — Crowell & Moring LLP

(57) ABSTRACT

An underbody module for a motor vehicle includes a left side element and a right side element, wherein the side elements extend in a longitudinal direction and are connected on the end sides by transverse elements, as a result of which an upper contact surface and a lower contact surface are formed. A floor element is arranged on the upper contact surface. A cover element is arranged or can be arranged on the lower contact surface, as a result of which an arrangement space is formed or can be formed between the floor element and the cover element, wherein the floor element is arranged in a gas-tight manner.

16 Claims, 3 Drawing Sheets

(51) Int. Cl.
  *B60L 58/26* (2019.01)
  *B62D 25/20* (2006.01)
(58) Field of Classification Search
  USPC ........................................................ 180/68.5
  See application file for complete search history.

(56) References Cited

U.S. PATENT DOCUMENTS

| | | | | |
|---|---|---|---|---|
| 10,964,984 | B2* | 3/2021 | Kellner | H01M 50/224 |
| 10,978,760 | B2* | 4/2021 | Wesche | H01M 10/425 |
| 11,024,918 | B2* | 6/2021 | Nierhoff | H01M 50/289 |
| 11,110,968 | B2* | 9/2021 | Ahn | B60K 1/04 |
| 11,404,740 | B2* | 8/2022 | White | H01M 50/242 |
| 2010/0307848 | A1 | 12/2010 | Hashimoto et al. | |
| 2011/0143179 | A1 | 6/2011 | Nakamori | |
| 2011/0174556 | A1 | 7/2011 | Hermann et al. | |
| 2013/0088044 | A1 | 4/2013 | Charbonneau et al. | |
| 2013/0162849 | A1* | 6/2013 | Wu | H04N 23/00 |
| | | | | 348/208.4 |
| 2014/0117716 | A1* | 5/2014 | Patberg | B62D 21/15 |
| | | | | 296/187.08 |
| 2017/0305249 | A1* | 10/2017 | Hara | B62D 25/2036 |
| 2017/0305250 | A1 | 10/2017 | Hara | |
| 2018/0105209 | A1 | 4/2018 | Fees et al. | |
| 2018/0312197 | A1 | 11/2018 | Takahashi | |
| 2019/0337575 | A1 | 11/2019 | Kellner et al. | |
| 2021/0016649 | A1 | 1/2021 | Sasmaz et al. | |
| 2021/0162849 | A1 | 6/2021 | Kerstan et al. | |
| 2021/0171106 | A1* | 6/2021 | Kellner | B60K 13/02 |

FOREIGN PATENT DOCUMENTS

| | | |
|---|---|---|
| DE | 10 2017 206 586 A1 | 10/2017 |
| DE | 10 2017 011 994 B3 | 1/2019 |
| DE | 10 2018 110 481 B3 | 3/2019 |
| DE | 10 2018 113 812 A1 | 12/2019 |
| JP | 2006-182295 A | 7/2006 |
| WO | 2019/121897 A1 | 6/2019 |

OTHER PUBLICATIONS

German-language Written Opinion (PCT/ISA/237) issued in PCT Application No. PCT/EP2020/069828 dated Oct. 9, 2020 (five (5) pages).
German-language Search Report issued in German Application No. 10 2019 121 682.6 dated Jul. 23, 2020 with partial English translation (19 pages).
English translation of Chinese Office Action issued in Chinese Application No. 202080043149.1 dated Dec. 13, 2023 with English translation (5 pages).

* cited by examiner

S1-S1

S2-S2

S3-S3

S4-S4

UNDERBODY MODULE AND MOTOR VEHICLE

BACKGROUND AND SUMMARY OF THE INVENTION

The invention relates to an underbody module for a motor vehicle, to a motor vehicle, in particular a passenger motor car, and to the use of a loadbearing structure.

In the present case, the focus lies, in particular, on partially or completely electrified vehicles. They require suitable arrangement spaces for the accommodation of the necessary energy stores, these being, in particular, electrical energy stores, such as lithium-ion batteries/accumulators. Their integration is increasingly more difficult, since the required installation space is getting larger and larger as a result of the rising requirements with regard to the range of the vehicles. It is also problematic in this connection that the storage elements are very heavy.

DE 10 2017 011 994 B3 proposes a fastening arrangement of an energy storage unit to a body of a motor vehicle, in the case of which fastening arrangement the energy storage unit has a loadbearing frame, which is fastened to the body such that it can be released without destruction, and a plurality of storage modules which are fastened to the loadbearing frame for the storage of electrical energy, a clearance being provided between at least two adjacently arranged storage modules, into which clearance at least one holding element which is provided on a side of a floor of the body, which side points downward in a vehicle vertical direction, protrudes, to which holding element the loadbearing frame is fastened.

It is an object of the present invention to provide an underbody module, a motor vehicle, and the use of a loadbearing structure, which develop the known concepts further and are distinguished here, in particular, by a simple construction and their high flexibility.

This object is achieved by way of an underbody module, by way of a motor vehicle, and by way of the use, in accordance with the independent claims. Further advantages and features result from the dependent claims, the description and the appended figures.

According to the invention, an underbody module for a motor vehicle comprises a left-hand side element and a right-hand side element, the side elements extending along a longitudinal direction and being connected on the end side by way of transverse elements, as a result of which an upper contact face and a lower contact face are formed, a floor element being arranged on the upper contact face, and a cover element being arranged or being capable of being arranged on the lower contact face, as a result of which an arrangement space is formed or can be formed between the floor element and the cover element, and the floor element being arranged in a gas-tight manner. The longitudinal direction corresponds to a driving direction of the vehicle. A gas-tightness is advantageously therefore provided toward the top, in the direction of a passenger compartment of the motor vehicle. In the present case, this is preferably a passenger motor car. The side elements can be oriented parallel to the longitudinal direction or, as an alternative, also obliquely with respect thereto. The side elements and the transverse elements can fundamentally be configured as straight or substantially straight carriers which together form a frame which is, in particular, peripheral, the frame forming or having the upper contact face and the lower contact face. The frame and the floor element extend between a front axle and a rear axle, arranged behind the former in the vehicle longitudinal direction, of the corresponding motor vehicle.

The upper contact face particularly advantageously forms an upper sealing plane or sealing face, the lower contact face forming a lower sealing plane or sealing face. The upper sealing plane and/or the lower sealing plane are/is therefore advantageously of level or flat or planar configuration, and advantageously do/does not have a three-dimensional structure. This has the advantage, in particular, of realizing the high requirements with regard to the tightness, in particular with regard to the gas-tightness.

The cover element is expediently fastened or can be fastened in a releasable and liquid-tight manner to the lower sealing face or to the lower contact face.

The underbody module therefore advantageously has two tightness zones. The first tightness zone is directed upward, in the direction of a vehicle interior compartment. The second tightness zone which is provided via the cover element protects, for example, in the case of temporary submersion of the vehicle, as can occur in the case of driving through water, against hose water and elevated water pressure, as can occur in the case of vehicle washing by means of steam jet, and against spraying with mud, stones, dust and snow (salt water). Best possible protection is also ensured against underbody washing in a car wash.

The gas-tightness toward the top makes, in particular, the safe arrangement of energy storage elements possible, such as, for example, batteries or accumulators. Thus, for example in the case of a cell defect (cf. "thermal propagation"), the gas which is produced here cannot pass into the (vehicle) interior compartment.

The cover element expediently supports at least one energy store, in particular an electrical energy store, in particular a storage cell or at least one storage cell. In accordance with one preferred embodiment, the cover element supports a or the high voltage battery of the respective motor vehicle, the high voltage battery comprising a multiplicity of individual cells which are arranged and interconnected on the cover element.

The underbody module can be understood to be a storage module, in which a multiplicity of individual cells are arranged and interconnected. It is expediently an integral constituent part, in particular a loadbearing constituent part, of the vehicle. As an alternative or in addition, other components can also be arranged in the arrangement space, in addition to the storage elements, for example (power) electronics, corresponding cable and line elements, etc.

In accordance with one embodiment, the high voltage battery is preassembled completely on the cover element. The cover element which is fitted in this way can advantageously be lifted up as one unit and can be fastened from below to the lower contact face. Conversely, simple dismantling of the high voltage battery is possible.

In accordance with one preferred embodiment, a loadbearing structure, in particular a mounting/dismantling frame, is used for mounting and dismantling the at least one energy store, in particular the energy storage elements. An arrangement or fastening of the at least one energy store, in particular the energy storage elements, takes place here advantageously on intermediate carriers which will be described further in the following text.

Furthermore as an alternative or in addition, the arrangement space can also be utilized for arranging or accommodating alternative and/or further storage elements, such as, for example, storage elements for liquid or gaseous fuels. In accordance with one embodiment, the arrangement space serves for the accommodation of a gas tank, such as a synthesis gas tank, a natural gas tank or a hydrogen tank.

In accordance with one preferred embodiment, the floor element is designed to form the floor of a vehicle interior compartment directly or immediately. One or more seat rails is/are advantageously mounted directly or immediately, in particular from above, on the floor element. The passenger compartment is expediently protected safely by way of the gas-tightness.

In accordance with one embodiment, at least one transverse element has at least one opening or recess which forms or provides an access into the arrangement space. The opening or recess is expediently correspondingly sealed, in particular also in a gas-tight or at least liquid-tight manner. In accordance with one embodiment, cable or line elements are routed out of or into the arrangement space via the opening or recess.

In accordance with one embodiment, a multiplicity of intermediate carriers are arranged spaced apart along the longitudinal direction between the side elements, the floor element preferably also being fastened to the intermediate carriers. This advantageously increases the rigidity of the frame. The intermediate carriers advantageously also have an assisting effect in the case of a crash, both in the case of frontal, rear and side crashes. In accordance with one embodiment, the intermediate carriers therefore extend substantially transversely with respect to the longitudinal direction, but can also run along or obliquely with respect to this longitudinal direction. The abovementioned seat rails can also be fastened to the intermediate carriers. The intermediate carriers can be fastened to the frame in a positively locking and/or non-positive manner, for example by way of rivets and/or screws. As an alternative or in addition, they are attached in an integrally joined manner, in particular welded, for example spot welded in accordance with one embodiment. Further preferred connecting technologies comprise laser welding, in particular also laser spot welding, and/or soldering, in particular CMT (Cold Metal Transfer) soldering or CMT brazing.

In accordance with one preferred embodiment, the at least one energy store is fastened to one or more of the intermediate carriers, in particular in a positively locking and/or non-positive manner. A multiplicity of energy stores are expediently fastened to the intermediate carriers. In accordance with one embodiment, the energy stores, in particular a multiplicity of individual cells, are arranged on the abovementioned loadbearing structure, in particular in a prefabricated, interconnected and checked manner, are lifted into the arrangement space by means of the loadbearing structure, and are fastened there, in particular to the intermediate carriers. The loadbearing structure is subsequently removed, and the arrangement space is closed by way of arranging of the cover element.

Both the floor element and the cover element can advantageously be produced from a plastic and/or metal material. In accordance with one preferred embodiment, both the floor element and the cover element are a (rolled) metal sheet, for example made from aluminum or steel or from an aluminum alloy or a steel alloy. The metal sheet can expediently be reinforced, for example by way of suitable reshaping methods. In accordance with one embodiment, the metal sheet has beads and/or edges which are suitable to reinforce the metal sheet per se and/or to provide local attachment and/or bearing faces or sealing faces. Typical plastic materials are preferably reinforced plastics, in particular fiber reinforced plastics, such as carbon fiber reinforced plastics, glass fiber reinforced plastics, etc.

The cover element and the floor element are expediently of planar configuration in the region of the contact faces.

The side elements, the transverse elements and the intermediate carriers can likewise be manufactured from plastic and/or from metal. Here, typical metal materials are also aluminum and/or steel and their alloys. Typical plastic materials are likewise preferably reinforced plastics, in particular fiber reinforced plastics, such as carbon fiber reinforced plastics, glass fiber reinforced plastics, etc.

In accordance with one embodiment, the side elements, the transverse elements and possibly the intermediate carriers are joined or connected in a positively locking and/or integrally joined and/or non-positive manner, in order to form the frame. The connecting points and the various elements and carriers are of gas-tight configuration, in particular.

The floor element is fastened in a positively locking and/or integrally joined and/or non-positive manner, in particular in a gas-tight manner, on the frame and the upper contact face which is formed as a result.

In accordance with one embodiment, the floor element is adhesively bonded and screwed and/or riveted or connected in an integrally joined manner, in particular welded and/or soldered, to the side elements and the transverse elements, possibly also to the abovementioned intermediate carriers. An integrally joined connection, such as adhesive bonding, is expediently combined with a positively locking and/or non-positive connection.

Preferred adhesives are chemically curing systems on a single-component or two-component basis, that is to say cold-curing or warm-curing structural adhesives. The reaction temperature of adhesives of this type lies, for example, in a range of 20–40° C. or 180-190° C.

Preferred integrally joined connecting technologies are welding methods, in particular fusion welding methods, such as arc welding, laser welding, electron beam welding, resistance spot welding, plasma welding or friction stir welding. Brazing-welding is also suitable as a further integrally joined connecting technology, since aluminum and steel materials can be combined here, for example. For the connection or attachment of the floor element, a pressure welding method can also advantageously be used, in particular, in accordance with one embodiment, for example friction welding, in particular friction stir welding.

Cathodic dip coating (CDC) is preferably used as corrosion protection.

In accordance with one embodiment, the side elements, the transverse elements and possibly the intermediate carriers are connected in an integrally joined manner, in particular welded and/or soldered, in order to form the frame. In accordance with one embodiment, the sill elements which will be described further in the following text are also welded to the side elements. The unit which is formed in this way is CDC coated in accordance with one embodiment.

An expediently likewise CDC coated floor element is then fastened in a gas-tight manner on the frame, preferably in a positively locking and/or non-positive manner, in accordance with one embodiment, for example by means of screws and/or rivets, and a preferably cold-curing structural adhesive.

In accordance with one alternative embodiment, the attachment of the floor element or its fastening to the frame takes place by means of a warm-curing structural adhesive and positively locking and/or non-positive connecting elements, in particular screws and/or rivets. CDC coating of the entire unit, frame and floor element takes place only subsequently, the adhesive curing advantageously being combined with the CDC paint drying here. A gas-tightness of the unit is therefore achieved only after the CDC cycle.

In accordance with one embodiment, the attachment of the floor element or its fastening to the frame takes place by means of one of the abovementioned welding or soldering methods. A gas-tightness is achieved at least after the subsequent CDC cycle of the entire unit.

In accordance with one alternative embodiment, the attachment of the floor element or its fastening to the frame takes place by way of structural adhesive bonding and riveting. A CDC coating of the entire unit, frame and floor element then takes place only subsequently. As has been mentioned, the adhesive curing can be combined with the CDC paint drying in the case of the use of a structural adhesive.

The cover element is also expediently CDC coated. Galvanic contacting between the frame and/or the floor element or the cover element expediently takes place by way of positively locking and/or non-positive connecting technologies, such as screws, in particular.

The cover element is expediently screwed to the frame. For sealing purposes, sealant elements or sealing elements are used which are designed to provide the desired sealing effect, in particular in combination with the screw connection.

In accordance with one embodiment, the side elements and the transverse elements are hollow profiles, the abovementioned sill elements or else outer longitudinal carriers being arranged on the side elements, which sill elements or outer longitudinal carriers have, on the end side, connector regions for pushing into or of elements of a vehicle body structure. In particular, the abovementioned connector regions are configured as nodes, in particular vehicle body nodes, which, in particular, make the arrangement of a front part or a rear part of the car possible, in particular by means of cold joining technologies, such as adhesive bonding. For example, the connector regions are configured in such a way that a longitudinal carrier of corresponding configuration of a front part and/or of a rear part of the vehicle can be arranged, in particular pushed in, in a shoe-like manner, or vice versa. Adhesively bonded interference fits are preferably used. Here, the parts are manufactured with play and, as has been described, are pushed into one another, for example. A corresponding cavity is produced after the adjustment and/or positioning of the mating parts. The adhesive is injected into the cavity and connects the two mating parts in a positively locking manner or in a positively locking and integrally joined manner. The cured structural adhesive transmits the entire load. Before the curing, the parts, as has been described, can advantageously still be (re-)adjusted. The underbody module is expediently designed to be integrated indirectly via the side elements into a vehicle body structure of a motor vehicle.

The abovementioned embodiment makes, in particular, a highly efficient checking or testing method of a high voltage battery possible. The side elements and transverse elements which are configured as hollow profiles form a gas-tight, loadbearing frame, on which the gas-tight floor element is arranged in a gas-tight manner. After arranging of the energy stores or the energy storage elements or the high voltage battery into the arrangement space which is formed in this way and closing of the arrangement space by way of attaching and fastening of the cover element, a unit is produced which can be checked and tested per se. In particular, the high voltage battery can be checked and tested even before it is installed in the vehicle. The abovementioned sill elements are expediently also (already) fastened to this unit. After checking has taken place, this unit can be forwarded to the further production process. In accordance with one embodiment, a front part module and a rear part module can expediently be fastened, in particular preferably by means of adhesive injection.

In accordance with one embodiment, the side elements and/or the transverse elements are open profiles, the side elements having U-shaped or L-shaped connector regions for the arrangement of sill elements. The sill elements or outer longitudinal carriers can be fastened accordingly in an integrally joined manner, for example adhesively bonded or welded, and/or also in a positively locking and/or non-positive manner, such as, for example, by means of screws or rivets. The use of open profiles advantageously makes the integration and/or use of the underbody module in current vehicle structures or vehicle body structures possible.

The transverse elements are expediently designed for arranging on a vehicle body structure. The arrangement can likewise take place in a positively locking and/or non-positive and/or integrally joined manner. The underbody module is expediently integrated both via the side elements and via the transverse elements into the vehicle body structure. The attachment via the transverse elements takes place, for example, by means of corresponding crossmembers of the vehicle body structure.

Here, mixed designs are possibly also possible, for example the combination of open profiles and hollow profiles.

The invention is also directed to a motor vehicle, comprising a vehicle body structure with an underbody module according to the invention.

In accordance with one embodiment, the underbody module is incorporated indirectly via the side elements into the vehicle body structure.

Alternatively, the underbody module is incorporated via the side elements and the transverse elements into the vehicle body structure.

The vehicle body structure per se comprises, in both cases, a front part and a rear part. These serve, for example, for the provision of the luggage compartment, the accommodation of further drive modules, for example also comprising an internal combustion engine, the attachment of the chassis, for example by means of corresponding suspension turrets, etc. The configuration of the front part and the rear part or the rear substructure is not restricted to a certain type. In accordance with one embodiment, this is a welded construction. In addition or as an alternative, cold joining methods such as adhesive bonding, screwing, riveting, etc. can also be used, however.

The invention is directed to the use of a temporary loadbearing structure for mounting and dismantling at least one energy store, in particular energy stores, in an underbody module according to the invention, in particular in its arrangement space. The individual cells of an electrical energy store are preferably prefabricated, interconnected and checked on the loadbearing structure. This unit is lifted into the arrangement space in a next step. Arranging and/or fastening of the energy storage elements on the intermediate carriers expediently take/takes place there. The loadbearing structure can subsequently be removed. Dismantling can expediently take place in the reverse sequence. The loadbearing structure can be configured as a welded construction. It advantageously does not remain on the vehicle.

Further advantages and features result from the following description of embodiments of underbody modules with reference to the appended figures. Here, different features can be combined with one another within the context of the invention.

DETAILED DESCRIPTION OF THE DRAWINGS

Figure 1:
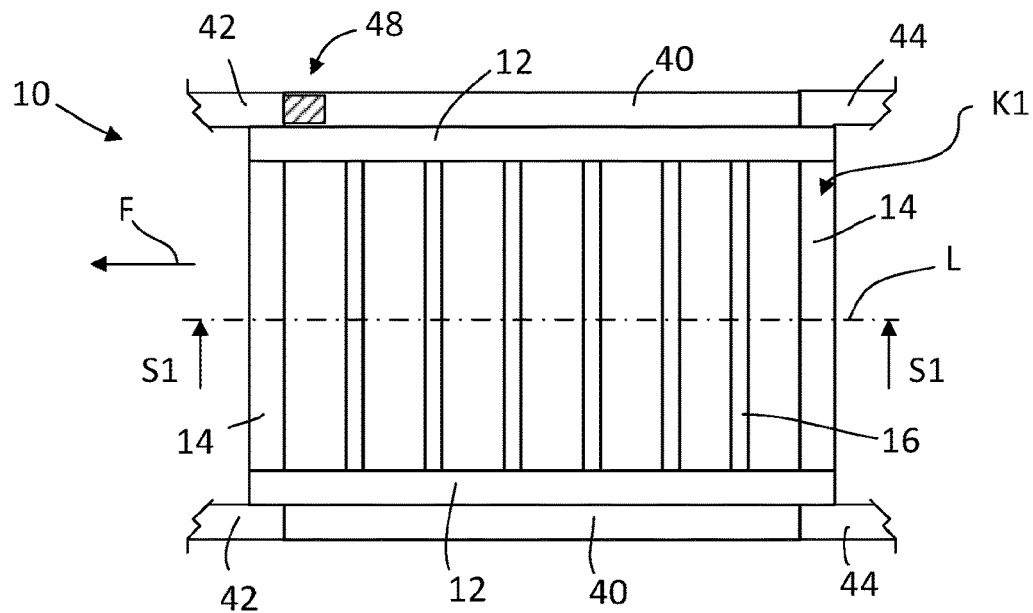
FIG. 1 shows a diagrammatic view of an underbody module in a top view.

FIG. 1 shows a diagrammatic top view of an underbody module 10, comprising two longitudinal carriers 12 which extend along a longitudinal direction L and, on the end side, are connected by way of transverse elements 14. The longitudinal direction L is in turn oriented along a driving direction F of a vehicle (otherwise not shown here). Load-bearing elements or sill elements or outer longitudinal carriers 40 are arranged laterally on the side elements 12. They have connector regions on the end side. Corresponding longitudinal carriers of a front part 42 or a rear part or a rear substructure 44 are arranged in them, for example are pushed into them. This is outlined diagrammatically at a point, cf. the connector region which is provided with the designation 48 and into which a carrier of the front part 42 is pushed in a shoe-like manner (cf. the hatched region). Spaced apart along the longitudinal direction L, intermediate carriers 16 are arranged or fastened between the side elements 12. The side elements 12, the transverse elements 14 and the intermediate carriers 16 (only one is provided with a designation for reasons of clarity) form, on the upper side, an upper contact face or sealing face or sealing plane K1 which serves for the gas-tight arrangement of a floor element (not shown here). The proposed construction is extremely flexible both with regard to the joining technologies and also with regard to the materials which are used. In accordance with one embodiment, for example, the side elements 12 and the transverse elements 14 are welded and subsequently CDC coated. The floor element (not shown here), expediently likewise already CDC coated, is preferably connected in a gas-tight manner by means of screwing and adhesive bonding.

Figure 2:
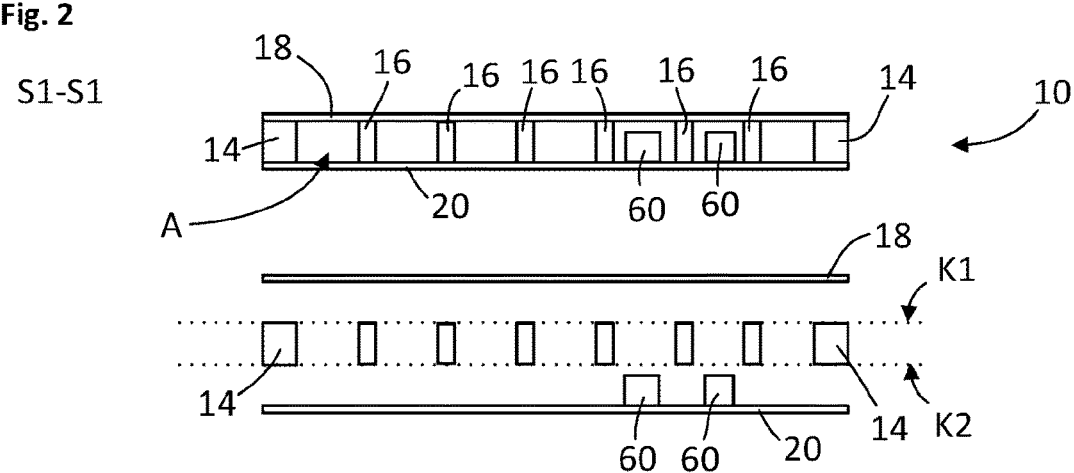
FIG. 2 shows the underbody module, known from FIG. 1, in a sectional illustration.

FIG. 2 shows the section S1-S1, as outlined in FIG. 1, two views being shown. These illustrations also show a floor element 18 and a cover element 20 which are not outlined in FIG. 1. It can be seen that an arrangement space A is formed between them. Two storage elements 60 (which can be battery or accumulator cells here, such as lithium-ion cells) are arranged diagrammatically. The lower image half is intended to illustrate that an upper contact face or sealing plane K1 and a lower contact face or sealing face or sealing plane K2 are formed by way of the transverse elements 14, in conjunction with the intermediate carriers 16 or also with the side elements 12 (not shown here). These are advantageously level or planar or flat. This effectively makes it possible for the desired sealing action to be provided, the floor element 18 ensuring, in particular, a gas-tight connection, whereas the expediently releasably arranged cover element 20 provides a liquid-tight sealing action.

Figure 3:
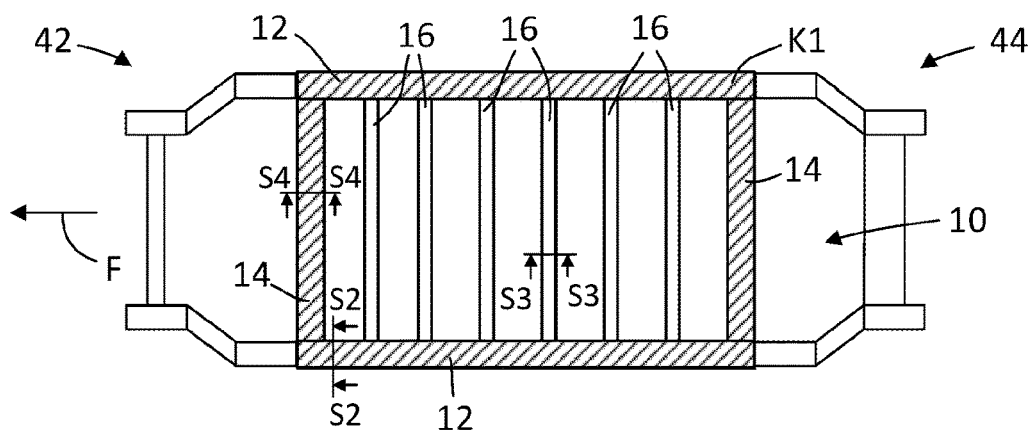
FIG. 3 shows a further diagrammatic view of an underbody module in a top view.

FIG. 3 shows a further diagrammatic illustration of a top view of an underbody module 10, comprising the known side elements 12 and the transverse elements 14. It is shown diagrammatically how a front part 42 or a rear part or rear substructure 44 is fastened to them. An upper sealing face K1 is shown in a hatched manner, the intermediate carriers 16 being excluded here. They can equally be added to the upper sealing face K1, however. The intermediate carriers 16 also expediently serve to fasten elements from the vehicle interior compartment, for example seat rails. The floor element is thus expediently designed to form the floor of a vehicle interior compartment. To this end, the floor element is expediently of substantially flat or level configuration, but can also have edges/beads or the like for reinforcement. In the present case, some sections are outlined which will be explained in greater detail in FIGS. 4-6.

Figure 4:
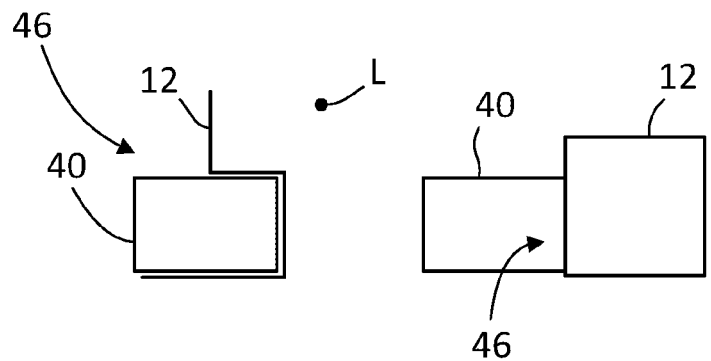
FIG. 4 shows different diagrammatic sections, as outlined in FIG. 3.

FIG. 4 shows the section S2-S2 which is outlined in FIG. 3. The left-hand image half shows a side element 12 as viewed along a longitudinal direction L, which side element 12 is formed as an open profile and has a U-shaped contact region 46 which serves for arranging a sill element (which is not shown in FIG. 3). The right-hand image half shows a side element 12 which is configured as a hollow profile. A contact region 46 for arranging the sill element 40 is configured here as a substantially level face.

Figure 5:
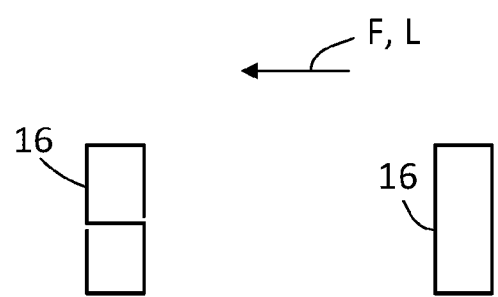
FIG. 5 shows further diagrammatic sections, as outlined in FIG. 3.

FIG. 5 shows the section S3-S3 which is outlined in FIG. 3, two embodiments also being shown here. In accordance with one embodiment, the intermediate carrier 16 is configured as a roll-formed steel profile which has substantially an S-shape and which is expediently laser welded along the open longitudinal seams. The right-hand embodiment shows a refinement as a hollow profile with a substantially rectangular cross section. An arrow which outlines the driving direction F or the longitudinal direction L is shown for orientation purposes.

Figure 6:
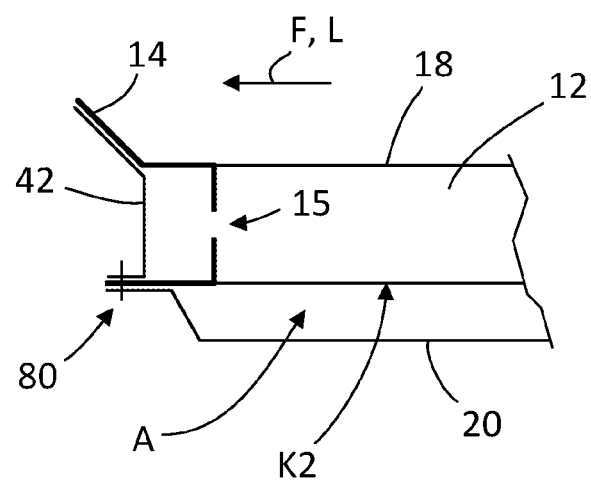
FIG. 6 shows a further diagrammatic section, as outlined in FIG. 3.

FIG. 6 shows the section S4-S4; a refinement can be seen here, in the case of which the integration of the underbody module takes place both via the side elements 12 and also via the transverse elements 14. It is outlined, in particular, that a transverse element 14, for example the front transverse element 14 in relation to the driving direction F, is fastened to a vehicle body structure 42; this can be a corresponding crossmember of the vehicle body structure 42. A fastening means which is, for example, a screw is provided with the designation 80. Via this, a cover element 20 is also fastened to a lower contact face K2. The designation 18 denotes a floor element 18, an arrangement space A being formed between the floor element 18 and the cover element 20. In order for, for example, lines or cables to be routed into or out of the arrangement space A, a corresponding opening or recess 15 is provided in the transverse element 14.

Figure 7:
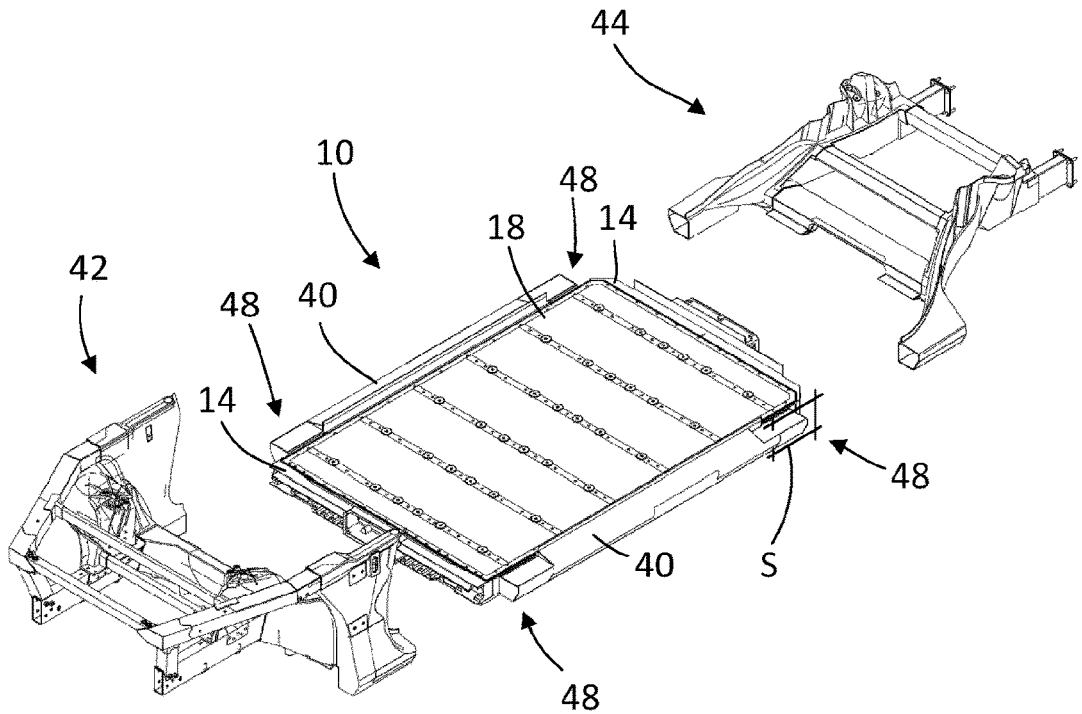
FIG. 7 shows a perspective view of a modular construction of a vehicle body structure.

FIG. 7 shows a perspective illustration of a modular construction of a vehicle body structure of a motor vehicle. In the present case, in particular, three modules are provided, a centrally arranged underbody module 10, a front part 42 and a rear part 44. The underbody module 10 advantageously provides an arrangement space for a high voltage battery, in particular a lithium-ion battery. Toward the top, in the direction of the passenger cell, the underbody module 10 is closed off in a gas-tight manner by way of a floor element 18. In one preferred embodiment, the latter directly forms the floor of the passenger compartment. The floor element 18 is arranged in a gas-tight manner on a frame which is formed by way of transverse elements 14 and side elements. They cannot be seen or can be seen only with difficulty in this illustration, however, since they are concealed by the laterally arranged sill elements 40. They have, on the end side, connector regions 48 which serve for arranging and fastening the further modules, in particular the front part 42 and the rear part 44. Their attachment preferably takes place by means of cold joining technologies, such as, for example, adhesive injection. A sectional plane S is outlined in order to illustrate this principle. The associated section is shown in FIG. 8.

Figure 8:
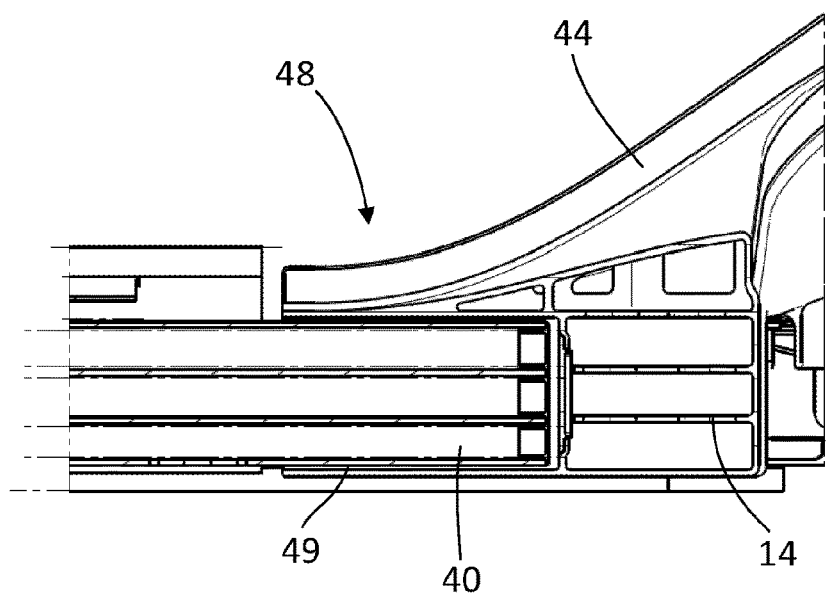
FIG. 8 shows a detailed view of a connector region, as outlined in FIG. 7.

FIG. 8 shows the section, as outlined by way of the sectional plane S in FIG. 7. In particular, the corresponding connector region 48 is shown on an enlarged scale here. In particular, the side element 40 can be seen which, in the embodiment which is shown here, is pushed into the rear part module 44 which is configured at this point correspondingly in a shoe-like manner. A gap or a cavity 49 is formed between the rear part module 44 and the sill element 40. After the positioning of the parts with respect to one another, a structural adhesive is injected into this gap or cavity 49. The parts can advantageously still be readjusted even after an injection of the adhesive. In this view, furthermore, the transverse element 14 can be seen which has a chamber-like construction in this embodiment.

LIST OF DESIGNATIONS

10 Underbody module
12 Side element
14 Transverse element
15 Opening, recess
16 Intermediate carrier
18 Floor element
20 Cover element
40 Loadbearing element, sill element
42 Vehicle body structure, front part
44 Vehicle body structure, rear part, rear substructure
46 Contact region
48 Connector region
49 Gap
60 Storage element
80 Fastening means
K1 Upper contact face/sealing plane/scaling face
K2 Lower contact face/sealing plane/sealing face
A Arrangement space
F Driving direction
L Longitudinal direction
S Sectional plane

What is claimed is:

1. An underbody module for a motor vehicle, comprising:
a left-hand side element and a right-hand side element,
the side elements extending along a longitudinal direction and being connected on an end side by way of transverse elements, as a result of which an upper contact face and a lower contact face are formed;
a floor element arranged on the upper contact face; and
a cover element arranged on the lower contact face, as a result of which an arrangement space is formable between the floor element and the cover element, wherein
the floor element is arranged on the upper contact face in a gas-tight manner.

2. The underbody module according to claim 1, wherein the upper contact face forms an upper sealing plane, and the lower contact face forms a lower sealing plane.

3. The underbody module according to claim 1, wherein the cover element is fastened in a releasable and liquid-tight manner to the lower contact face.

4. The underbody module according to claim 1, wherein the cover element supports at least one energy store.

5. The underbody module according to claim 1, wherein the energy store is an electrical energy store.

6. The underbody module according to claim 1, wherein the floor element is configured to form a floor of a vehicle interior compartment.

7. The underbody module according to claim 1, wherein at least one transverse element has at least one opening or recess which forms an access into the arrangement space.

8. The underbody module according to claim 1, wherein a multiplicity of intermediate carriers are arranged spaced apart along the longitudinal direction between the left and right side elements, and
the floor element also is fastened to the intermediate carriers.

9. The underbody module according to claim 1, wherein the floor element is adhesively bonded and screwed and/or riveted or connected in an integrally joined manner to the left and right hand side elements and the transverse elements.

10. The underbody module according to claim 1, wherein the left and right hand side elements and the transverse elements are connected in an integrally joined manner.

11. The underbody module according to claim 1, wherein the left and right hand side elements and the transverse elements are hollow profiles, and
sill elements are arranged on the side elements, which sill elements have, on the end side, connector regions for pushing into elements of a vehicle body structure.

12. The underbody module according to claim 1, wherein the side elements and the transverse elements are open profiles, and
the side elements have U-shaped contact regions for arrangement of sill elements.

13. The underbody module according to claim 12, wherein
the transverse elements are designed for arranging on a vehicle body structure.

14. A motor vehicle, comprising:
a vehicle body structure with an underbody module, wherein the underbody module comprises a left-hand side element and a right-hand side element,
the side elements extending along a longitudinal direction and being connected on an end side by way of transverse elements, as a result of which an upper contact face and a lower contact face are formed;
a floor element arranged on the upper contact face; and
a cover element arranged on the lower contact face, as a result of which an arrangement space is formable between the floor element and the cover element, wherein
the floor element is arranged on the upper contact face in a gas-tight manner.

15. The motor vehicle according to claim 14, wherein the underbody module is incorporated via the side elements into the vehicle body structure.

16. A method of mounting or dismantling energy stores in an underbody module of a vehicle, the method comprising:
providing the underbody module which has a left-hand side element and a right-hand side element, the side elements extending along a longitudinal direction and being connected on an end side by way of transverse elements, whereby an upper contact face and a lower contact face are formed, wherein a floor element is arrangable on the upper contact face, and a cover element is arrangable on the lower contact face, whereby an arrangement space is formable between the floor element and the cover element;

mounting or dismantling at least one energy store in or from the arrangement space of the underbody module using a load bearing structure, wherein the load bearing structure is subsequently removed and does not form part of the vehicle.

\* \* \* \* \*